(No Model.)

S. C. HUNTER.
Cultivator.

No. 235,087.      Patented Dec. 7, 1880.

Witnesses.
F. L. Ouraud
Alex Mahon

Inventor.
Silas C. Hunter,
by A. M. Smith,
Atty.

UNITED STATES PATENT OFFICE.

SILAS C. HUNTER, OF CHARLOTTE, NORTH CAROLINA.

CULTIVATOR.

SPECIFICATION forming part of Letters Patent No. 235,087, dated December 7, 1880.

Application filed May 6, 1880. (No model.)

*To all whom it may concern:*

Be it known that I, SILAS C. HUNTER, of Charlotte, county of Mecklenburg, State of North Carolina, have invented certain new and useful Improvements in Cotton-Cultivators, of which the following is a full, clear, and exact description, reference being had to the accompanying drawings, making part of this specification, in which—

Figure 1:
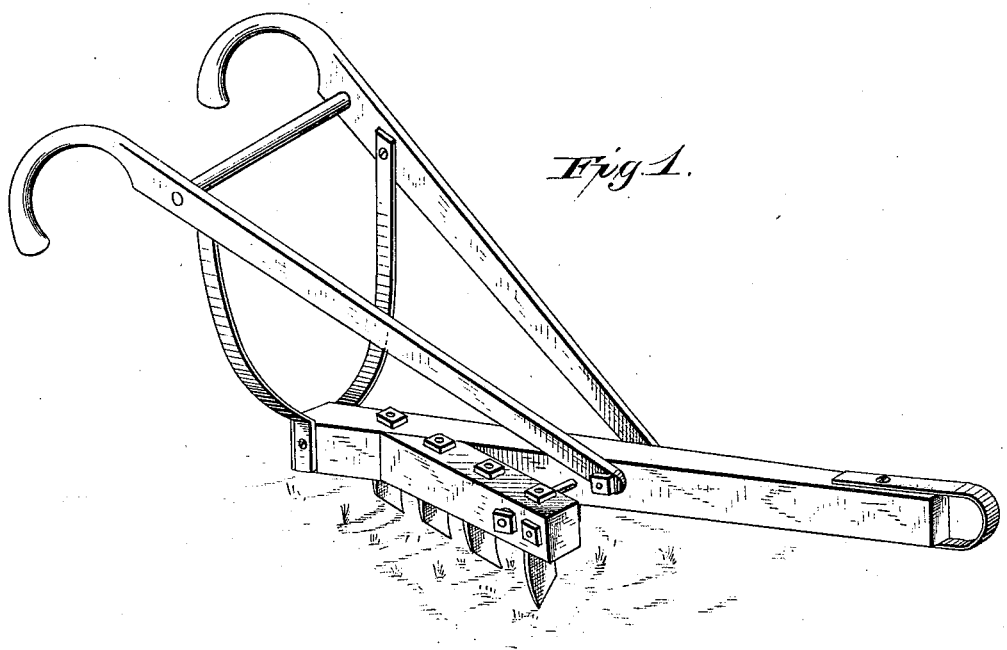
Figure 2:
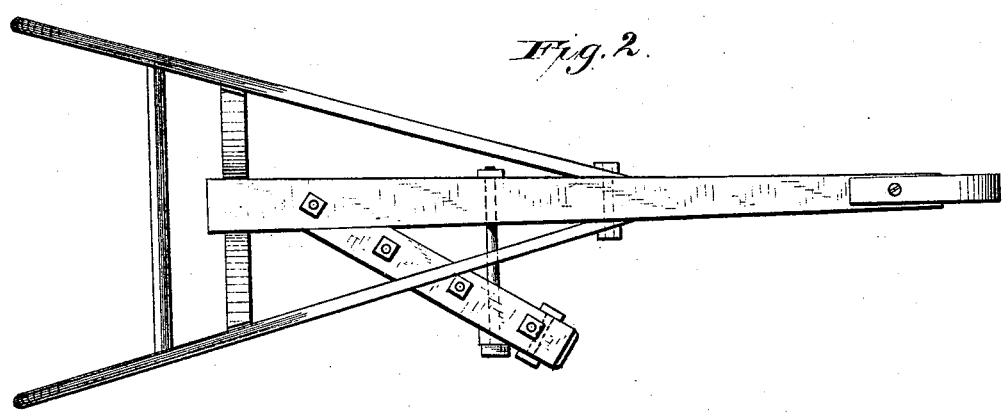

Figure 1 is a perspective view of my improved cultivator, and Fig. 2 is a plan or top view of the same.

Similar letters of reference denote corresponding parts in both figures.

My invention relates to a novel construction of the cultivator-frame and a novel arrangement of the teeth or shovels, whereby the cultivator is adapted to work the ground close up to the rows of plants without throwing the soil over upon the same, at the same time permitting the animal propelling the cultivator to walk midway between the rows or sufficiently removed therefrom to prevent injury to the plants.

The invention consists in a novel construction of the beam or frame of the cultivator, whereby the hoes or shovels are made to converge from the forward shovel toward the beam or line of draft, and in making said forward shovel, which is designed to work in close proximity with the row of plants being cultivated in reverse form from the succeeding hoes or shovels, in such manner that said forward shovel will operate to remove clods, &c., from the plants and prevent the earth being thrown over on them, the succeeding hoes serving to hill or bank the soil up to the rows, as hereinafter explained.

In the accompanying drawings, A represents the beam of the cultivator, provided with upwardly-inclined diverging handles B B, similar to the beam and handles of an ordinary plow, and to which the draft-animal is attached in any usual manner.

The beam A has an arm, A', rigidly secured to it by mortise and tenon or otherwise, said arm extending forward from its point of attachment at or near the rear end of the beam, and on one side thereof, in a line diverging laterally at an angle of about thirty degrees, more or less, as shown.

The forward end of arm A' is connected with the beam A by a lateral brace rod or bar, *a*, which serves to relieve the joint between the arm and beam of strain and to make the frame of the cultivator, consisting of the beam A and arm A', simple in form and strong and substantial in construction.

The hoes or shovels *c c'* are arranged on the line of the diverging arm A', the forward one, *c*, being secured in said arm at its forward outer end, and the others, in rear thereof, to said arm, or in line therewith to beam A, as shown, and the forward hoe or tooth is made in such form that its point, working in close proximity with the row of plants being cultivated, shall pick up and crowd outward away from the row the clods, soil, &c., instead of throwing them over on said row, while the teeth *c' c' c'*, in rear thereof and farther removed from the row, are made in the reverse form, and as they follow the tooth or shovel *c* they serve to fill the furrow formed by shovel *c* with fresh earth, and gradually to build up the row or bank the earth up against the same. In other words, if the cultivator is designed to work to the left of the row operated upon, as represented in the drawings, the forward shovel will be a left-hand shovel, throwing the earth outward away from said row, while the other shovels will be right-hand shovels, throwing the earth to right toward said row, the reverse arrangement being observed if the cultivator is constructed to work to the right of the row. In either case the hoes are made to converge from one side backward toward the line of draft and permit the draft-animal to work midway between the rows or sufficiently removed therefrom to prevent injury of the plants by said animal.

I am aware that forwardly-diverging arms have been employed to which the teeth have been attached; also, that teeth have been employed arranged to turn or throw the earth in opposite directions; and I therefore do not claim these features separately and irrespective of the arrangement or combination; but

What I claim, and desire to secure by Letters Patent, is—

The forwardly-projecting diverging arm A', rigidly connected with the beam A, in combination with teeth arranged, the forward one to work in close proximity with the row and to throw the soil outward or away therefrom, and the others in a reverse position for throwing the soil inward toward the row, as described.

SILAS C. HUNTER.

Witnesses:
C. N. G. BUTT,
W. J. F. LIDDELL.